United States Patent [19]
Knapp et al.

[11] 3,827,816
[45] Aug. 6, 1974

[54] COUPLING DEVICE

[75] Inventors: William H. Knapp, Naperville; Elmer M. Kesl, Downers Grove; Robert C. Miner, Clarendon Hills, all of Ill.

[73] Assignee: International Harvester Company, Chicago, Ill.

[22] Filed: Oct. 20, 1972

[21] Appl. No.: 299,475

[52] U.S. Cl............ 403/322, 403/325, 403/359
[51] Int. Cl.............................................. F16b 7/00
[58] Field of Search .......... 403/109, 322, 324, 325, 403/359, 361, 377; 285/313, 314, 315, 316, 317

[56] References Cited
UNITED STATES PATENTS

| | | | |
|---|---|---|---|
| 2,948,559 | 8/1960 | Recker | 403/359 X |
| 2,952,482 | 9/1960 | Torres | 285/313 |
| 3,179,450 | 4/1965 | Recker | 403/325 |
| 3,480,310 | 11/1969 | McElwain | 403/322 |
| 3,587,032 | 6/1971 | Normann | 285/316 |

*Primary Examiner*—Werner H. Schroeder
*Attorney, Agent, or Firm*—Dennis K. Sullivan; Floyd B. Harman

[57] ABSTRACT

A shielded automatic drive shaft knuckle coupler having a hub with a splined shaft-admitting bore and radial openings mounting detent pins intersecting the bore, the detent pins being held in locked position by a cam ring which is rotatable about the hub to release position whereat a releasable latch engages one of the pins. The latch is released by the engaged pin when said pin is moved out of the bore during insertion or withdrawal of the shaft to which the knuckle is coupled or to be coupled.

10 Claims, 11 Drawing Figures

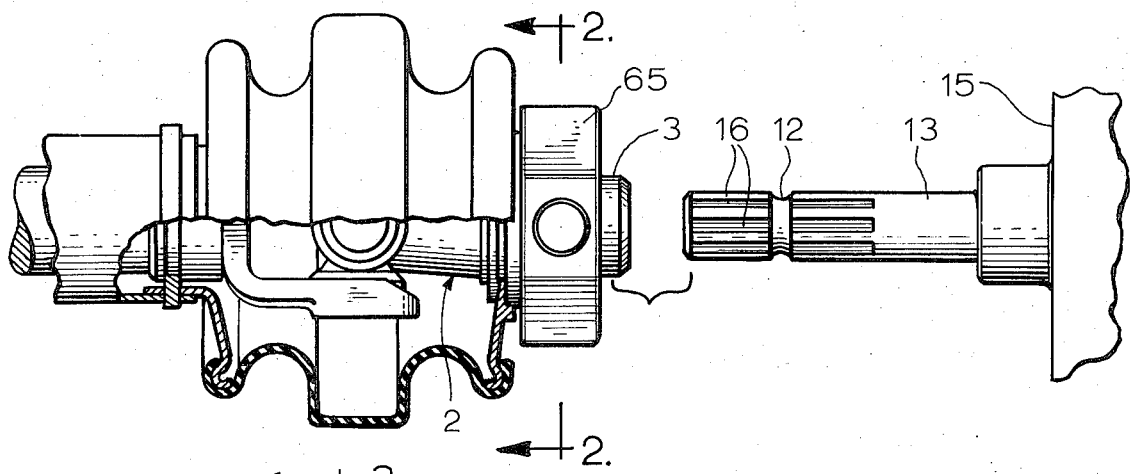
FIG. 1
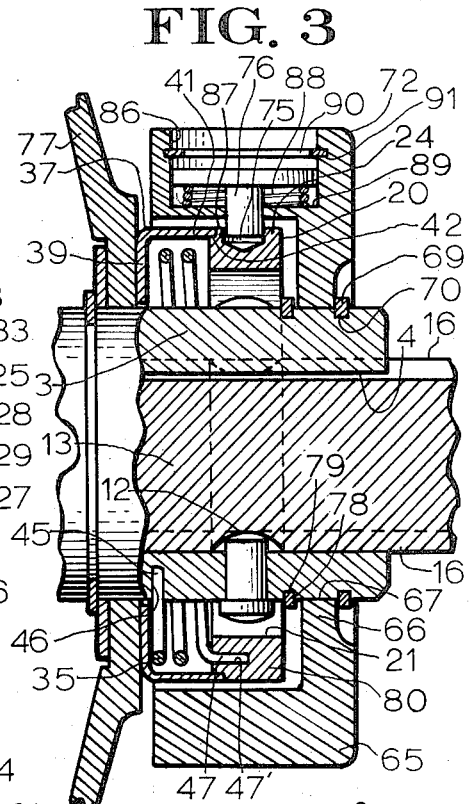
FIG. 2
FIG. 3
FIG. 2A
FIG. 4

COUPLING DEVICE

DISCUSSION OF THE PRIOR ART

Devices of the prior art which provide completely shielded means for coupling and uncoupling of driving line sections are cumbersome to use and those familiar to applicants require holding axially displaceable parts against the opposition of a biasing spring and then rotationally aligning the coupler with the shaft and forcing the two together. The splines frequently are dirty and require considerable effort to clean.

The ASAE standards require certain spacings between the ends of the PTO shaft to the hitch point, namely: 14 inches for 540 RPM; with a 1⅜-inch shaft, 16 inches for 1,000 RPM with a 1⅜-inch shaft, and 20 inches for 1,000 RPM with a 1¾-inch shaft. Thus the lengths of the respective parts is critical and with an axially displaceable locking device, the hub of the knuckle must be increased one-half to three-fourths inch in an already restricted space. Furthermore, many of the locking devices are complicated and if not adequately protected, will jam and are difficult to free. The common pin type which extends chordally through the hub bore is considered unsatisfactory because shielding is not provided and can freeze up which requires hammering to dislodge.

SUMMARY OF THE INVENTION

This invention is concerned with a novel coupler of the type under consideration wherein the parts are encased in protective sleeves or collars and locking and unlocking is accomplished by a rotary motion in a simple and effective manner.

A more specific object is to provide a novel coupler hub of which is provided with locking detents extending radially from the shaft bore, and wherein a rotary cam ring has circumferentially offset portions which close and open the outer ends of the radial openings to respectively lock and release the detents and wherein a latch is provided for releasably engaging one of the detents for holding the cam ring in release position, the latch being triggered to release by said one of said detents when forced out of the bore by the insertion or withdrawal of the shaft.

These and other objects and advantages inherent in and encompassed by the invention will become more readily apparent from the specification and the drawings, wherein:

FIG. 1 is an exploded view of a drive line assembly incorporating the invention;

FIG. 2 is an enlarged cross-sectional view taken substantially on line 2—2 of FIG. 1 showing the coupler in released position;

FIG. 2A is a view of a portion of the structure shown in FIG. 2 showing the parts in movement to released position;

FIG. 3 is a longitudinal sectional view taken on line 3—3 of FIG. 2;

FIG. 4 is a fragmentary view taken substantially on line 4—4 of FIG. 2;

DESCRIPTION OF THE INVENTION

Figure 5:
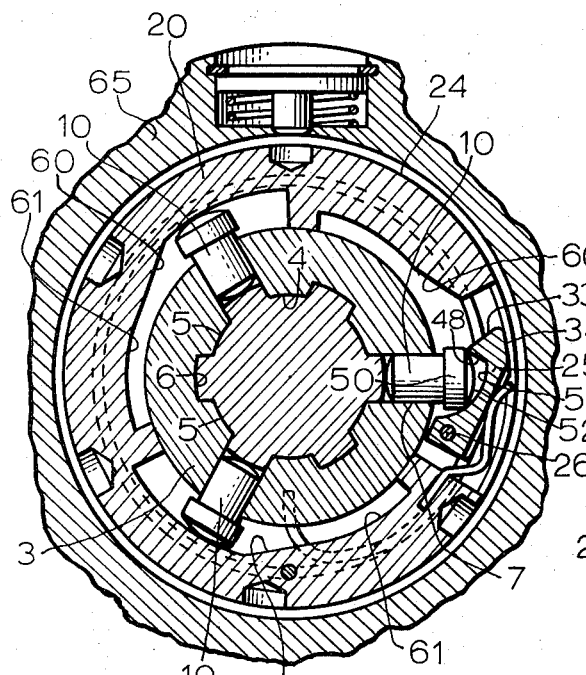
FIG. 5 is a sectional view comparable to FIG. 2 showing the parts during withdrawal or insertion of the shaft with respect to the coupler.

Referring to the drawings, there is shown a knuckle coupler generally designated 2 having a hub 3 with an axial bore 4 which has a plurality of axially extending circumferentially displaced splines 5,5 defining intervening grooves or slots or interstices 6,6.

The hub is provided with preferably three radial openings or apertures 7,7 extending from the bore 4 to an annular outer periphery 8. Each opening receives a detent which is shown in this embodiment as a pin 10 of a diameter closely fitting the diameter of the respective opening 7 and having a head 50.

Figure 6:
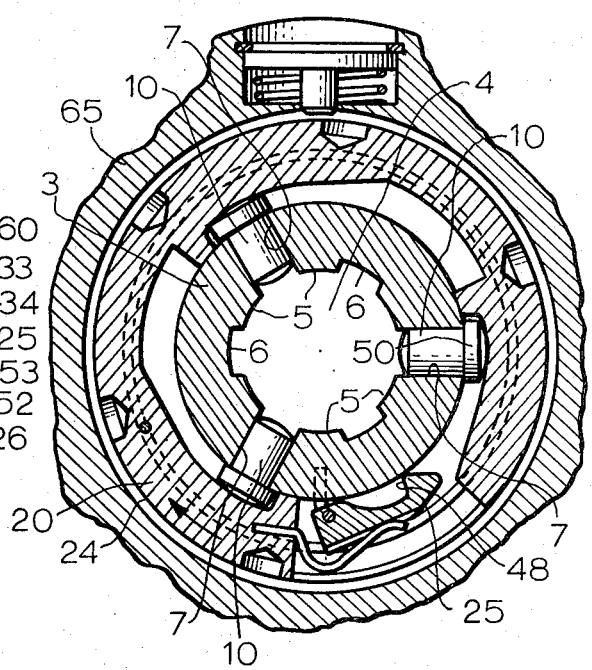
FIG. 6 is a sectional view comparable to FIGS. 2 and 5 showing the coupler in locked position.
Figures 7, 8:
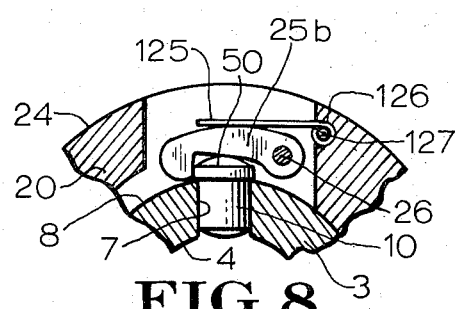
FIGS. 7–10 are transverse sectional views of different latching devices incorporated in the invention, all shown in released position.
Figures 9, 10:
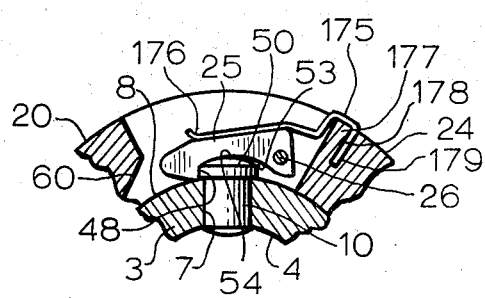

The pins in locking position, as shown in FIGS. 3 and 6, extend into the bores 4 and project into a circumferential notch or groove 12 of a PTO shaft 13 which is mounted on a tractor fragmentarily shown at 15.

The PTO shaft has splines 16 which are arranged to fit between splines 5,5 into respective slots 6,6 through axial movement of the knuckle onto the shaft.

The pins are held in locking positions by a cam ring 20 which has a plurality of pockets 21,21 interrupting its inner cylindrical periphery which closely fits onto the hub periphery 8 and to unlock the coupler is rotatable thereon to radially align the pockets 21,21 with respective openings 7,7 as best seen in FIG. 2.

At least one of the pockets 21 is recessed at 23 to the outer periphery 24 of the ring and in it there is mounted a latch 25 which is pivoted at one end as at 26 to the ring body at one side of the adjacent pin 10. The latch 25 is biased inwardly by a leaf spring 27 which is disposed outwardly of the latch. One end of the spring 27 bears at 28 against the outer side 29 of the latch 25 and the other end 30 is anchored to the ring and extends into a slot 31 formed in the ring at one side of the associated pocket 21.

As shown in FIG. 2A, the latch 25 has a pointed nose including inner and outer converging surfaces 33, 34.

The cam construction and disposition of the lower or inner surfaces 33 causes the latch to cam upwardly against the adjacent detent pin when the cam ring is rotated to release position against the action of the torsion spring 35, shown in FIG. 3, which is sleeved over the hub and encased in a housing 37 which has a radial wall 39 with an outer annular flange 41 which is fitted into an annular groove in the back side 42 of the ring 20 about its outer periphery 24. The spring has an anchor end 45 fitted into a radial opening 46 in the hub and its other end 47 extends into opening 47' in the cam ring. The housing 37 is rotatable about the hub with the cam ring.

Referring now to FIG. 5, the latch 25 is formed with a catch 48 which snaps behind the head 50 of one of the detent pins 10. The head 50 enters into a recess 52 in the latch. The recess is defined by a margin outwardly of the head 50, which forms a cam surface 53 of arcuate profile which does not complement the spherical or crown profile 54 of the top of the head 50. The cam surface 53 diverges with the surface 54 toward the pivot 26 and engages the head 50 of the associated pin at the side of its axis adjacent to the pivot 26 of the latch. Thus when the latch-engaging pin moves radially outwardly upon the splines 5,5 of the shaft 13 forcing the pin 10 outwardly, the latch is tilted as shown in FIG. 5 releasing the catch 48 from the head and latch cams on its surface 53 against surface 54 on the head 50 of the related pin. The catch then rides upon the head 50 as the torsion spring rotates the cam ring to a closed or locked position.

As the ring rotates to locked position, the head surface 54 of each pin wedges with an associated cam surface 60 formed on the ring at one or trailing side of the associated pocket and slopes toward the periphery of the hub in a direction contra to the rotation of the ring to locking position as effected by the action of the spring. Each surface 60 merges into a cam locking face 61 which is spaced outwardly from the hub periphery a gradually tapering distance sufficient to squeeze the thickness of the head 50 of the associated pin between surface 61 and the peripheral surface of the hub.

A free rotating collar 65 is mounted on the hub to shield the coupling mechanism and, as best seen in FIG. 3, comprises a radial wall 66 with a center aperture 67 which admits the hub therethrough, the collar being held on the hub by a snap ring 69 which is entered into a groove 70 in the hub outwardly of the wall 66. The wall 66 is formed integrally with a peripheral annulus or ring 72 which extends over the cam ring.

The latch is in the position shown in FIG. 2 when the coupler is in set or released position, whereat upon the catch 48 being released by the insertion in or withdrawal of the shaft 13 from the coupler and the pins being free to enter into the bore in the above described manner the ring is rotated in a direction engaging the cam edges 60 with the surfaces 54 and forcing the pins under the locking surfaces 61 which radially align with the respective pins.

It will be noted that the cam ring and spring housing are maintained in assembly on the hub between a collar 77 of the hub and a snap ring 78 in groove 79 in the hub outwardly of the wall 80 of the cam ring.

The cam ring is provided with a series of radial openings 75 which are disposed in radial alignment with the path of a locking pin 76 which is piloted in an opening 84 in the annulus 72 of the collar. The pin 76 is connected at its outer end to a press button 85 which is pocketed in an enlarged bore 86 aligned with opening 84 and open to the outer peripheral surface 87 of the annulus. The button and pin assembly serves as locking means and is biased outwardly against snap ring 90 in groove 91 by a spring 88 compressed between the inner side of the button and an opposing shoulder 89 within bore 86.

The collar and cam ring are interlocked by pressing the button in and engaging the pin 76 with any selected opening 75 whereupon the collar and ring can be rotated together to release position.

In the following further embodiments, parts identical with the previous embodiment will be identified with corresponding reference numerals.

EMBODIMENT OF FIG. 7

In this embodiment the shape of the latch 25a is slightly modified and comprises a pivot 26a intermediate its ends, the end 100 remote from the latch 33a provides a seat for one end of a compression spring 101 which bears at one end at 102 against end 100 and is housed in a pocket 103 in the ring body and seats as at 104 against the closed end 105 of the pocket.

EMBODIMENT OF FIG. 8

In this embodiment the spring 125 has an eye 126 at its anchor end fixed on a pin 127 which is secured to the ring body.

EMBODIMENT OF FIG. 9

In this embodiment the spring 150 has an anchor end 151 bent radially outwardly and is fitted into a generally radial slot 152 in the ring body.

EMBODIMENT OF FIG. 10

In this arrangement the anchor end 175 of the spring 176 is U-shaped and hooks over a portion 177 of the cam ring body and has a leg 178 extending inwardly from the periphery of the cam ring into a slot 179.

What is claimed is:

1. A coupler comprising a hub having an outer peripheral surface and a center bore for receiving a complementary shaft therein and interlocking therewith, a detent-mounting opening extending radially from said bore to said outer periphery, a detent element in the opening movable between a locking position extending into the bore and a release position withdrawn from the bore, a cam ring rotatably mounted about the hub in radial alignment with said opening and having circumferentially disposed locking and release portions opposing said peripheral surface of the hub, said locking portion comprising a locking surface positionable in locking position to block exit of the detent element from the bore and said release portion in release position alignable with said detent element and comprising a pocket admitting entry of the adjacent one end of the detent element attendant to exit of the other end of the detent element from the bore to release a shaft from the bore or admit such shaft into the bore, means for biasing said ring from release position to locking position, and releasable locking means carried on said ring and on said detent element for holding said cam ring against rotation in release position and operable upon movement of the detent element into said pocket attendant to insertion of a shaft with respect to the bore to release said locking means and accommodate rotation of said ring to locking position.

2. A coupler comprising a hub having an outer peripheral surface and a center bore for receiving a complementary shaft therein and interlocking therewith, a detent-mounting opening extending radially from said bore to said outer periphery, a detent element in the opening movable between a locking position extending into the bore and a release position withdrawn from the bore, a cam ring rotatably mounted about the hub in radial alignment with said opening and having circumferentially disposed locking and release portions opposing said peripheral surface of the hub, said locking portion comprising a locking surface positionable in locking position to block exit of the detent element from the bore and said release portion in release position alignable with said detent element and comprising a pocket admitting entry of the adjacent one end of the detent element attendant to exit of the other end of the detent element from the bore to release a shaft from the bore or admit such shaft into the bore, means for biasing said ring from release position to locking position, and releasable locking means carried on said ring and on said detent element for holding said ring in release position and operable upon movement of the detent element into said pocket attendant to insertion of a shaft with respect to the bore to release said locking means and accommodate rotation of said ring to locking position, said locking means comprising a catch surface on said one end of the detent element, and a latch on the ring adapted to catch onto said catch surface upon said ring being moved to release position.

3. The invention according to claim 2 wherein the latch and said one end portion of the detent element are provided with means for camming said latch to release from said detent element upon movement of said detent element into said pocket.

4. A coupler comprising a hub having an outer peripheral surface and a center bore for receiving a complementary shaft therein and interlocking therewith, a detent-mounting opening extending radially from said bore to said outer periphery, a detent element in the opening movable between a locking position extending into the bore and a release position withdrawn from the bore, a cam ring rotatably mounted about the hub in radial alignment with said opening and having circumferentially disposed locking and release portions opposing said peripheral surface of the hub, said locking portion comprising a locking surface positionable in locking position to block exit of the detent element from the bore and said release portion in release position alignable with said detent element and comprising a pocket admitting entry of the adjacent one end of the detent element attendant to exit of the other end of the detent element from the bore to release a shaft from the bore or admit such shaft into the bore, means for biasing said ring from release position to locking position, and releasable locking means carried on said ring and on said detent element for holding said ring in release position and operable upon movement of the detent element into said pocket attendant to insertion of a shaft with respect to the bore to release said locking means and accommodate rotation of said ring to locking position, said releasable locking means comprising a catch member swingably mounted on the cam ring within said pocket and spring biased to latching position with said one portion of the detent element.

5. A coupler comprising a hub having an outer peripheral surface and a center bore for receiving a complementary shaft therein and interlocking therewith, a detent-mounting opening extending radially from said bore to said outer periphery, a detent element in the opening movable between a locking position extending into the bore and a release position withdrawn from the bore, a cam ring rotatably mounted about the hub in radial alignment with said opening and having circumferentially disposed locking and release portions opposing said peripheral surface of the hub, said locking portion comprising a locking surface positionable in locking position to block exit of the detent element from the bore and said release portion in release position alignable with said detent element and comprising a pocket admitting entry of the adjacent one end of the detent element attendant to exit of the other end of the detent element from the bore to release a shaft from the bore or admit such shaft into the bore, means for biasing said ring from release position to locking position, releasable locking means carried on said ring and on said detent element for holding said ring in release position and operable upon movement of the detent element into said pocket attendant to insertion of a shaft with respect to the bore to release said locking means and accommodate rotation of said ring to locking position, a collar encasing said cam ring, and cooperative releasable interlocking means on the collar and ring for constraining the ring and collar to rotate together for displacing the cam ring from locking to release positions.

6. A coupler comprising a hub having an outer peripheral surface and a center bore for receiving a complementary shaft therein and interlocking therewith, a detent-mounting opening extending radially from said bore to said outer periphery, a detent element in the opening movable between a locking position extending into the bore and a release position withdrawn from the bore, a cam ring rotatably mounted about the hub in radial alignment with said opening and having circumferentially disposed locking and release portions opposing said peripheral surface of the hub, said locking portion comprising a locking surface positionable in locking position to block exit of the detent element from the bore and said release portion in release position alignable with said detent element and comprising a pocket admitting entry of the adjacent one end of the detent element attendant to exit of the other end of the detent element from the bore to release a shaft from the bore or admit such shaft into the bore, means for biasing said ring from release position to locking position, and releasable locking means carried on said ring and on said detent element for holding said ring in release position and operable upon movement of the detent element into said pocket attendant to insertion of a shaft with respect to the bore to release said locking means and accommodate rotation of said ring to locking position, said locking means comprising a spring-loaded catch member having a hook portion with a cam surface adapted to swing said catch member over the said one end of the detent element and engage the hook portion therebehind attendant to said cam ring being displaced from locking to release positions.

7. The invention according to claim 6 wherein said catch member and adjacent end of the detent element have cooperating cam surfaces adapted to effect movement of the catch member to a position releasing said hook portion from the element and movement of the ring to locking position.

8. A coupler comprising a hub having an outer peripheral surface and a center bore for receiving a complementary shaft therein and interlocking therewith, a detent-mounting opening extending radially from said bore to said outer periphery, a detent element in the opening movable between a locking position extending into the bore and a release position withdrawn from the bore, a cam ring rotatably mounted about the hub in radial alignment with said opening and having circumferentially disposed locking and release portions opposing said peripheral surface of the hub, said locking portion comprising a locking surface positionable in locking position to block exit of the detent element from the bore and said release portion in release position alignable with said detent element and comprising a pocket admitting entry of the adjacent one end of the detent element attendant to exit of the other end of the detent element from the bore to release a shaft from the bore or admit such shaft into the bore, means for biasing said ring from release position to locking position, releasable locking means carried on said ring and on said detent element for holding said ring in release position and operable upon movement of the detent element into said pocket attendant to insertion of a shaft with respect to the bore to release said locking means and accommodate rotation of said ring to locking position, a shield structure normally freely rotatable about said cam ring and hub, and self-releasing means for interlocking said shield structure with the cam ring for moving said cam ring from locked position to release position and comprising a radially displaceable engaging element on the shield engageable with the cam ring.

9. A coupler comprising a hub having an outer peripheral surface and a center bore for receiving a complementary shaft therein and interlocking therewith, a detent-mounting opening extending radially from said bore to said outer periphery, a detent element in the opening movable between a locking position extending into the bore and a release position withdrawn from the bore, a cam ring rotatably mounted about the hub in radial alignment with said opening and having circumferentially disposed locking and release portions opposing said peripheral surface of the hub, said locking portion comprising a locking surface positionable in locking position to block exit of the detent element from the bore and said release portion in release position alignable with said detent element and comprising a pocket admitting entry of the adjacent one end of the detent element attendant to exit of the other end of the detent element from the bore to release a shaft from the bore or admit such shaft into the bore, means for biasing said ring from release position to locking position, and releasable locking means carried on said ring and on said detent element for holding said ring in release position and operable upon movement of the detent element into said pocket attendant to insertion of a shaft with respect to the bore to release said locking means and accommodate rotation of said ring to locking position, said one end of said detent element comprising a head abuttable with the peripheral surface of the hub and limiting extension of the detent element at its other end into the bore and said locking surface on the ring is cammed to lock said head against said peripheral surface.

10. The invention according to claim 9 wherein said head provides an outwardly facing convex cam surface, and said releasable locking means including a catch having a cam surface engageable with said convex surface on said head.

* * * * *